July 9, 1957  K. R. JOHNSON  2,798,539
SAFETY BELT

Filed Oct. 15, 1953  2 Sheets-Sheet 1

INVENTOR.
KENNETH R. JOHNSON
BY
Attorney

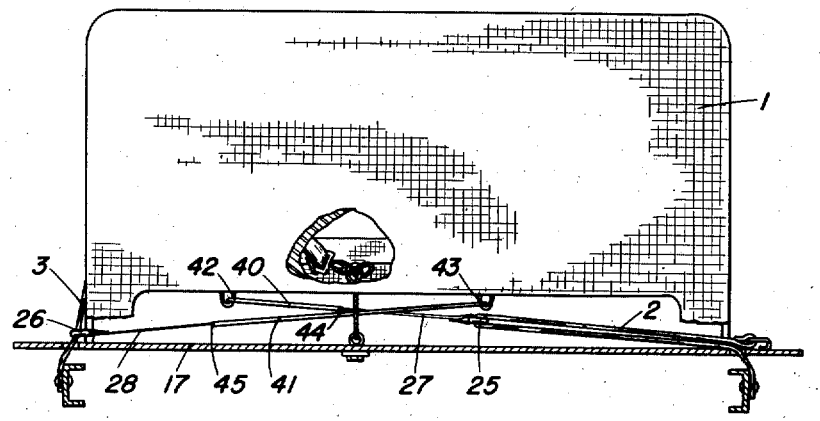

United States Patent Office 2,798,539
Patented July 9, 1957

2,798,539

SAFETY BELT

Kenneth R. Johnson, Madison, Wis.

Application October 15, 1953, Serial No. 386,242

10 Claims. (Cl. 155—189)

This invention relates to a safety belt and more particularly to means for retracting a safety belt adapted to maintain a person in the seat of a vehicle.

Safety belts have been proposed for automobiles. One of the factors which has inhibited the installation of safety belts in automobiles is the objectionable appearance of the two ends of a safety belt lying loose on a vehicle seat when no occupant is in the seat and the discomfort felt by an occupant of a vehicle seat who does not use a safety belt but sits upon the unused portions thereof.

Means have meen proposed heretofore for retracting safety belts but such means have not been adapted to easily handle the length of belt which it is necessary to retract with ease, economy and simplicity.

An object of this invention is therefore an effective and simple means for retracting a vehicle safety belt.

Another object is means operable underneath the seat of a vehicle, to retract a safety belt extending across the upper surface of the seat.

Another object is means for retracting a vehicle seat safety belt into a space underneath the seat.

Still another object is means for retracting a vehicle seat safety belt into a space underneath the vehicle seat substantially occupying little more than one-half the length of the safety belt.

Further objects will become apparent from the drawings and the following detailed description in which it is my object to illustrate the applicability of the invention without thereby limiting its scope to less than that of all equivalents which will be apparent to those skilled in the art and in which like reference numerals refer to like parts and in which:

Figure 3 is an elevation, partially cross-sectional and partially cut-away, of a modification of the embodiment of Figure 2.

Figure 1:
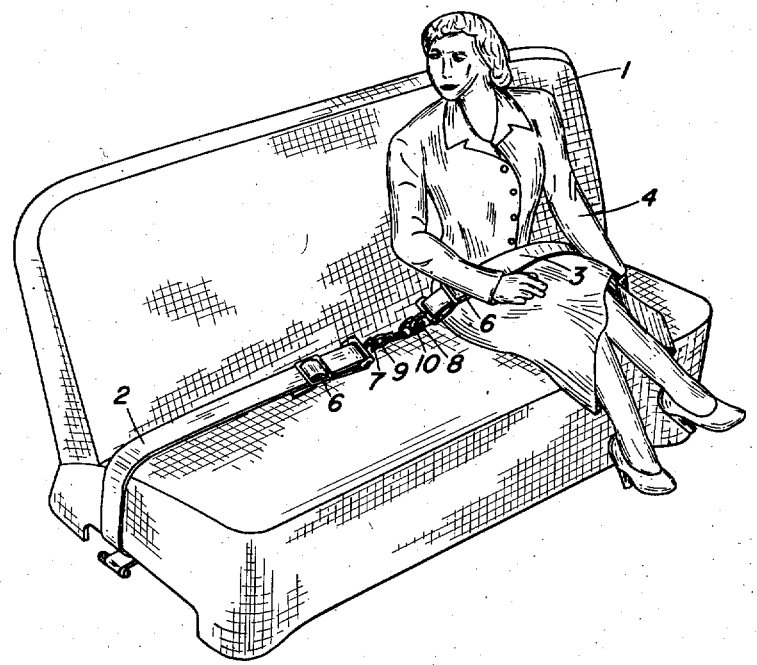
Figure 1 is a perspective view of one embodiment of the belt of my invention installed upon the seat of a vehicle.

Referring now to Figure 1 there is shown a vehicle seat 1, provided with safety belts 2 and 3, adapted to retain occupant 4 in place on the seat. Belts 2 and 3 may each extend upwardly from underneath the seat and thence over the upper surface of the seat. Each may be provided with a buckle 6 for adjusting the length of the belt and the ends of belts 2 and 3 may be provided with easily connectible and disconnectible snap or hook means 7 and 8 of any type known to the art which may be attached respectively to fixed rings or eyes 9 and 10. Each of belts 2 and 3 may be retracted underneath the seat as shown in Figure 2.

Figure 2:
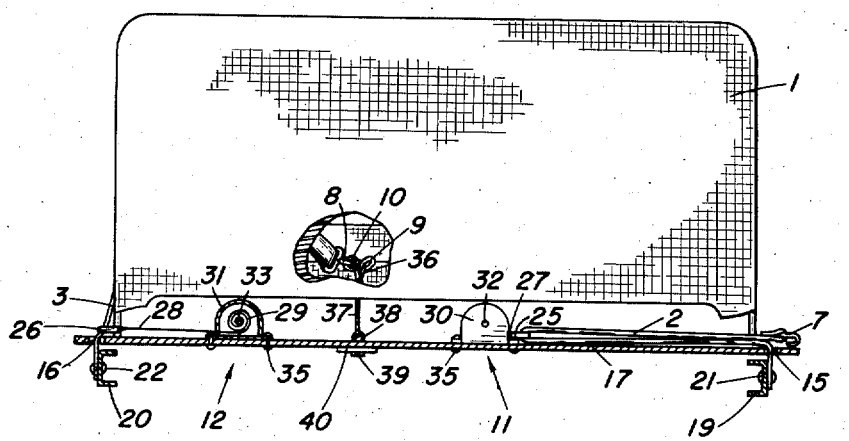
Figure 2 is an elevation, partially cross-sectional and partially cut-away, of the back of a vehicle seat having installed thereon the same embodiment of my invention.

Referring now to Figure 2 there is shown the back of seat 1 and installed thereunder retracting means indicated generally as 11 and 12 adapted to respectively retract belts 2 and 3. In Figure 2, belt 3 is shown as extending over the lap of an occupant of seat 1, whereas belt 2 is shown in a fully retracted position underneath seat 1. The lower ends of belts 2 and 3 may extend through holes 15 and 16 in the floor 17 of the vehicle and may be attached to vehicle frame members 19 and 20 by any suitable means such as bolts or rivets 21 and 22. Upwardly of holes 15 and 16 the belts may pass through rings 25 and 26 each respectively attached by metal straps 27 and 28 to springs 29 mounted upon spindles 32 and 33 contained within and securely attached to housings 30 and 31. Housings 30 and 31 may be securely attached to vehicle floor 17 by any suitable means such as bolts 35.

Eyes or rings 9 and 10 to which snaps 7 and 8 at the ends of belts 2 and 3 may be attached, may be held firmly in place by being attached to eye 36 at the end of cable 37 which at its other end may be securely attached to floor 17 by any suitable means such as eye-bolt 38 having at its end nut 39 bearing against the extremely broad washer 40.

The springs at 29 are shown as spiral springs but they may quite suitably be either helical or helical twist springs.

In the embodiment illustrated in Figure 3, retracting means for belts 2 and 3 may consist of elastic cords 40 and 41. One end of each of said cords may be attached respectively to the seat 1 at 42 and 43 with any suitable means such as hooks 42 and 43. The cords may equally well be attached by any suitable means to floor 17. The other ends 44 and 45 of elastic cords 40 and 41 may be attached to rings 25 and 26 by any suitable connecting means such as metal straps 27 and 28. Elastic cords 40 and 41 act in the same manner as springs 29 to retract a bight of each of belts 2 and 3 underneath seat 1, since rings 25 and 26 are slidably engaged with belts 2 and 3 and adapted to draw bights of said belts underneath the seat. Each of rings 25 and 26 slides along a portion of the belt, as the belt is retracted.

The ends of springs 29 or elastic cords 40 and 41 which are most remote from rings 25 and 26 may quite suitably be attached either to the underside of seat 1 or to floor 17.

Rings 25 and 26 may be round or toroidal rings or may be square rings; square rings are generally better adapted to easily slide over the usually flat belting utilized for safety belts and it has been found quite suitable to provide the outermost bar of such a square ring with a small roller, in the manner of a harness ring, to facilitate movement of the ring along the belt as the belt is retracted and extended.

Although the belts of my invention are shown arranged in such a manner that the right-hand belt is adapted to extend over either one or two passengers and the left-hand belt is adapted to extend over only the left hand occupant, the invention relates also to belts adapted to be attached together at their ends, instead of to eyes such as eyes 9 and 10, in such manner as to extend jointly over three or more occupants of the seat. It also relates to provision of a similar belt to extend over only one occupant and it also relates to two belts of equal length secured to an eye or eyes such as 9 and 10 midway between one side of the seat and the other side.

To operate the device of my invention, a person desiring to ride in or drive the vehicle may take his place in the seat and may then easily reach down upon his left or right side, depending upon which end of the seat he is sitting on, grasp the end of the belt, pass it across his lap and snap it into a fixed eye. At any time that he desires to leave the vehicle he may easily unsnap the belt and it will automatically return to place with greater or less force depending upon the size of the springs or elastic cords.

Each of belts 2 and 3 are adapted to slide through rings 25 and 26 when snap 7 or snap 8 is disengaged from eye 9 or eye 10. Retracting means 11 or retracting means 12 will respectively operate to pull either belt 2 or belt 3 underneath the seat. Spiral spring 29 winds up, drawing either metal strap 27 or 28 into housing either 30 or 31 and thereby drawing ring 25 or 26 and a bight of belt underneath the seat.

The belt retracting means of my invention overcomes one of the major disadvantages of certain previous retractable belts in that both of its ends when in the operative position, extending across the lap of a seat occupant, are firmly secured to frame or body members of the vehicle and are not secured to the seat itself which may be relatively insecurely attached to the frame or body members of the vehicle. It has been well established that when the seat of the vehicle is insecurely attached to body members of the vehicle, a seat belt which is attached only to the seat itself is relatively ineffective and may indeed be a hazard since it contributes a sense of false security to the occupant. In a crash or collision the insecurely-attached seat is torn from its attachments and seat, occupant and belt are tossed as a unit against the inside of the body, usually with great injury to the occupant. An additional disadvantage in certain previous retractable belts is that their lower ends are directly attached to the retracting means which themselves may be torn apart when severe forward shocks are imposed upon the occupant as by a collision.

In my invention the ends of the belt are securely attached to the frame members of the vehicle and are not attached to the retracting means. The retracting spring of my invention does not serve as an adjustment for the length of the belt and the length of each belt must be adjusted with buckle such as buckle 6. However no part of the retracting means is a part of the structure which is tensioned when an occupant, secured in place by a belt, is thrown against the belt. Force is transmitted directly through the belt to secure connecting means at each end of the belt itself.

It will thus be seen that my invention is broad in scope and is not to be limited excepting by the claims.

Having thus disclosed my invention, I claim:

1. A device for retracting a safety belt comprising an elastic member, means for attaching one end of said member to a portion of the vehicle and a ring attached to the other end of said member adapted to extend around a safety belt.

2. The device of claim 1 wherein said member is a spiral spring.

3. The device of claim 1 wherein said member is an elastic cord.

4. A retractable safety belt comprising a belt having one end attached to a vehicle frame member, extendable across a portion of a vehicle seat and having its other end attachable to and quickly disconnectable from means securely attached to the frame of the vehicle and unattached to said seat, and retracting means comprising an elastic member having one end thereof attached to said vehicle under such seat and the other end attached to a ring extending around and slidably engageable with said belt, adapted to draw a bight of said belt under said seat.

5. The device of claim 4 wherein said member is a spiral spring.

6. The device of claim 5 wherein said member is an elastic cord.

7. A retractable safety belt comprising a belt having one end attached to a vehicle frame member, extendable across a portion of a vehicle seat, and means adapted to retract said belt comprising an elastic cord, means for attaching one end of said cord to a portion of the vehicle underneath said seat, a ring extending around and slidably engaged with said belt, and means for attaching said ring to the other end of said elastic cord whereby said cord is adapted upon contraction to draw a bight of said belt underneath said seat.

8. A retractable safety belt comprising a belt having one end attached to a non-seat portion of said vehicle, extendable across a portion of a vehicle seat and having its other end attachable to and quickly disconnectable from means securely attached to a portion of the vehicle and unattached to said seat, and retracting means comprising an elastic member having one end thereof attached to said vehicle under such seat and the other end attached to a ring extending around and slidably engageable wtih said belt, adapted to draw a bight of said belt under said seat.

9. The device of claim 8 wherein said member is a spiral spring.

10. The device of claim 8 wherein said member is an elastic cord.

References Cited in the file of this patent

UNITED STATES PATENTS

| 894,052 | Radtke | July 21, 1908 |
|---|---|---|
| 2,071,903 | Shively | Feb. 23, 1937 |
| 2,280,694 | Embree et al. | Apr. 21, 1942 |
| 2,468,560 | Kirkpatrick | Apr. 26, 1949 |
| 2,480,915 | George | Sept. 6, 1949 |
| 2,488,858 | Franz | Nov. 22, 1949 |

UNITED STATES PATENT OFFICE

CERTIFICATE OF CORRECTION

Patent No. 2,798,539 July 9, 1957

Kenneth R. Johnson

It is hereby certified that error appears in the printed specification of the above numbered patent requiring correction and that the said Letters Patent should read as corrected below.

Column 3, line 20, for "cocupant" read --occupant--; column 4, line 13, for the claim reference numeral "5" read --4--; line 34, for "wtih" read --with--.

Signed and sealed this 3rd day of September 1957.

(SEAL)
Attest:
KARL H. AXLINE
Attesting Officer

ROBERT C. WATSON
Commissioner of Patents